(12) United States Patent
Macklin et al.

(10) Patent No.: US 7,857,101 B2
(45) Date of Patent: Dec. 28, 2010

(54) WICK HOLDER FOR A LUBRICATING SYSTEM OF A LOCOMOTIVE TRACTION MOTOR SUPPORT BEARING

(75) Inventors: John E. Macklin, Fremont, NE (US); Robert B. Foster, Erie, PA (US); Paul Bien, Downers Grove, IL (US)

(73) Assignee: Magnus Div. of L. V. Ventures, Inc., Fremont, NE (US)

( * ) Notice: Subject to any disclaimer, the term of this patent is extended or adjusted under 35 U.S.C. 154(b) by 1372 days.

(21) Appl. No.: 11/284,635

(22) Filed: Nov. 21, 2005

(65) Prior Publication Data

US 2007/0137940 A1    Jun. 21, 2007

(51) Int. Cl.
 *F16N 7/12*  (2006.01)
(52) U.S. Cl. .................... 184/64; 184/102; 384/409
(58) Field of Classification Search ............... 184/64, 184/102, 103.1; 384/399, 408, 409, 412, 384/410; 417/421
See application file for complete search history.

(56) References Cited

U.S. PATENT DOCUMENTS

| | | | |
|---|---|---|---|
| 2,849,262 A | 8/1958 | Wood, Jr. et al. | |
| 2,980,472 A | 4/1961 | Harkenrider | |
| 3,210,138 A | 10/1965 | Boller et al. | |
| 3,662,858 A | 5/1972 | Peterson | |
| 3,827,769 A | 8/1974 | Boller et al. | |
| 3,905,659 A | 9/1975 | Renk et al. | |
| 3,940,189 A | 2/1976 | Renk et al. | |
| 4,229,056 A | 10/1980 | Renk | |
| 5,082,089 A | 1/1992 | Renk et al. | |
| 7,568,554 B2 * | 8/2009 | Umber et al. | 184/55.2 |
| 2007/0169999 A1 * | 7/2007 | MacKlin et al. | 184/64 |

FOREIGN PATENT DOCUMENTS

WO PCT/US2006/030007    5/2007

* cited by examiner

*Primary Examiner*—Michael R Mansen
*Assistant Examiner*—Robert T Reese
(74) *Attorney, Agent, or Firm*—Milton S. Gerstein; Much Shelist

(57) ABSTRACT

An improved wick-holder for mounting a felt lubricating wick of a lubricating system for lubricating the axle journal surface supported in a support bearing of a traction motor used in a locomotive is provided with a plurality of oil-reservoir louver pockets or splash-cups molded or pressed into the wick holder which store oil from the time that the oil reservoir was full or near its maximum height and which store splashed oil during normal operational use, and delay the run off of the oil to increase the oil saturation of the wick housed within the wick holder. The oil reservoir pockets are located above the minimum serviceable oil level, and are designed to improve and increase oil saturation of the wick. As a result of the increased oil saturation, the wick are, therefore, capable of delivering increased amounts of oil to the axle journal area. The increased amount of oil saturation and reduced wicking height provide increased protection against traction motor support bearing failure if a locomotive is used with axle journal oil levels near the recommended minimum oil levels. Each reservoir pocket or splash cup is preferably louver-shaped, whereby during normal locomotive operating service, the splashing of oil in the bearing housing oil reservoir is collected and delivered to the lubricating wick. In a second embodiment, the reservoir pockets or splash cups are provided on a separate splash sleeve telescopingly mounted over, and to, the lower, free end of the central lubricating wick.

9 Claims, 15 Drawing Sheets

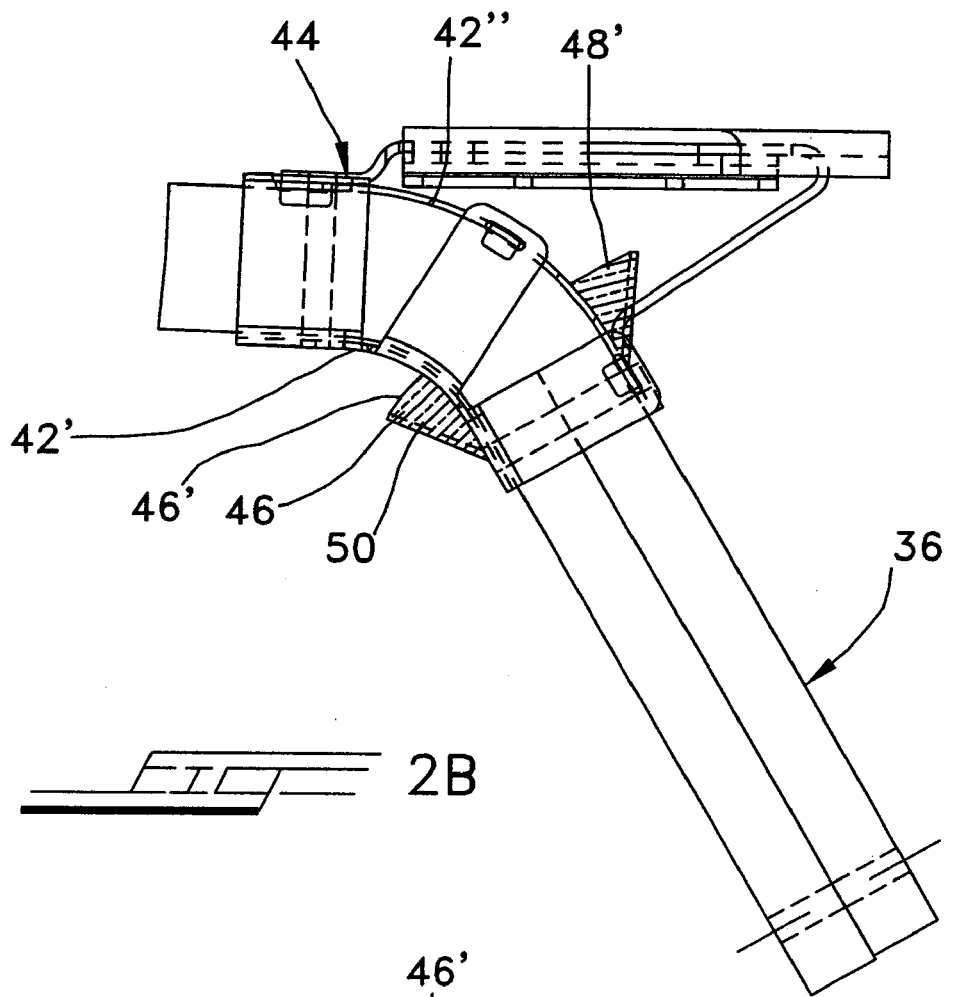
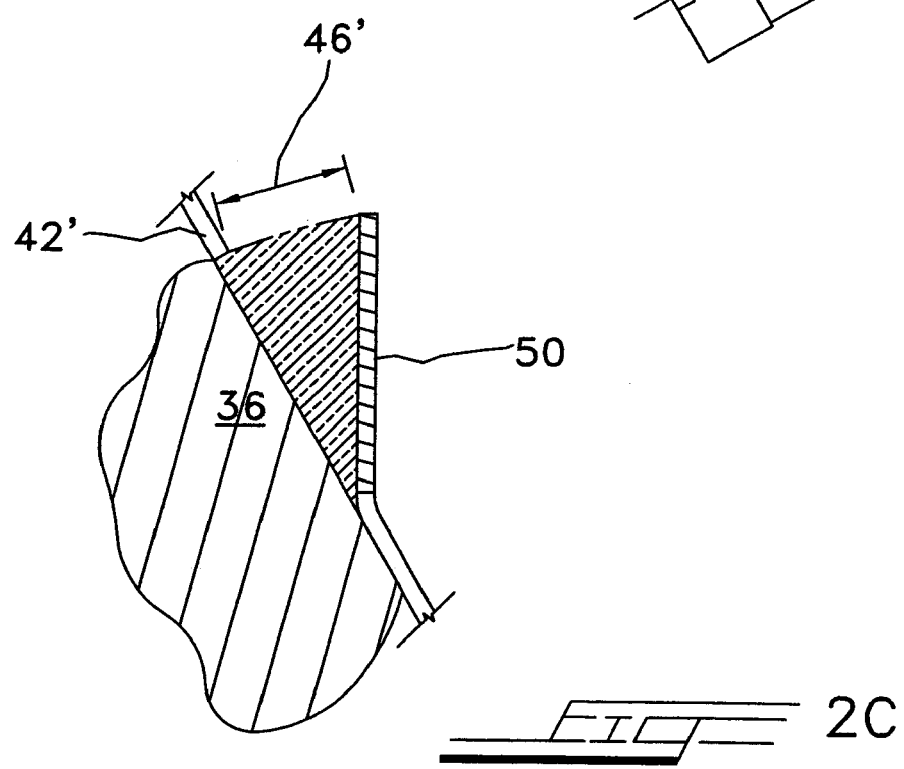

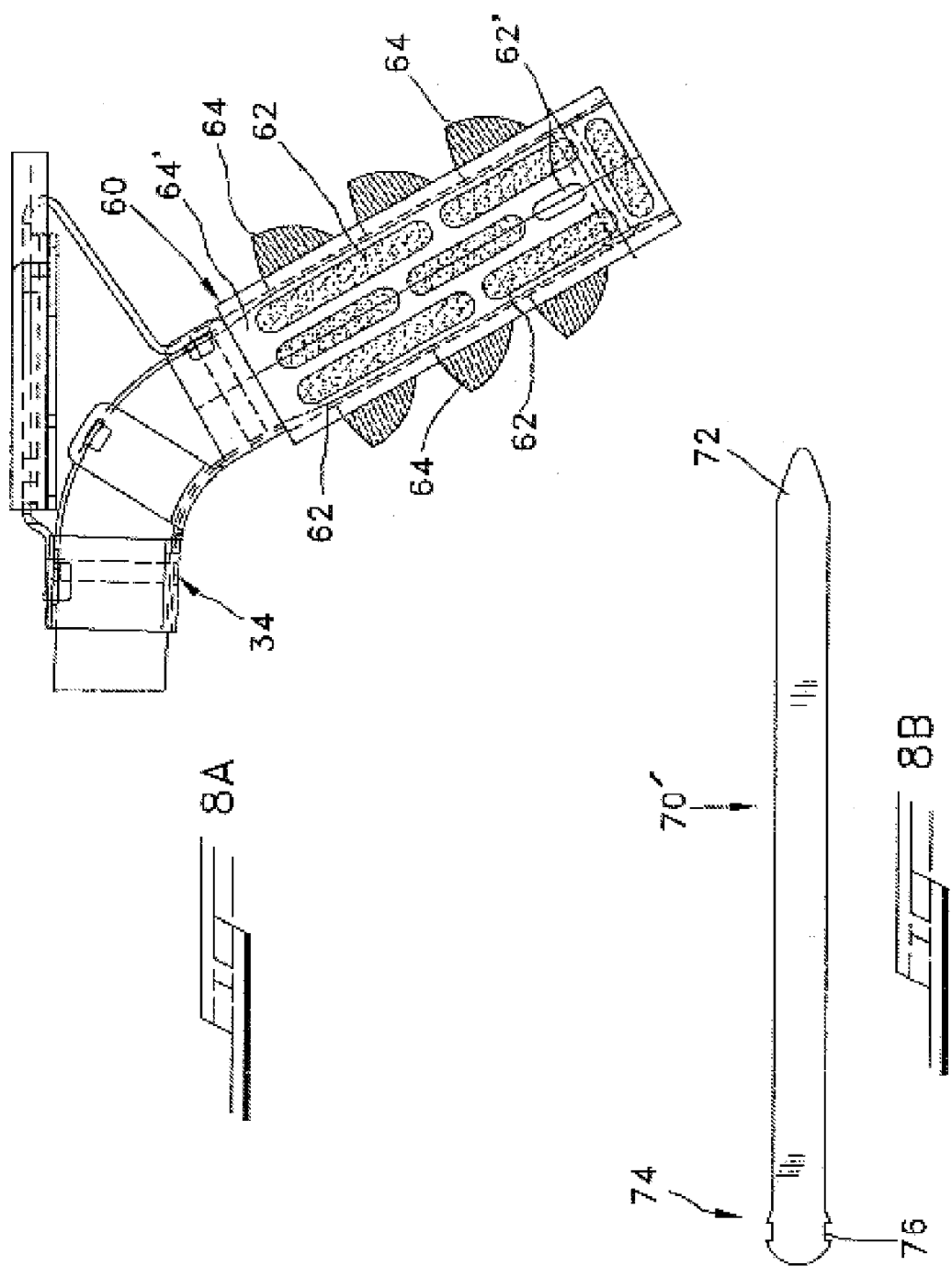

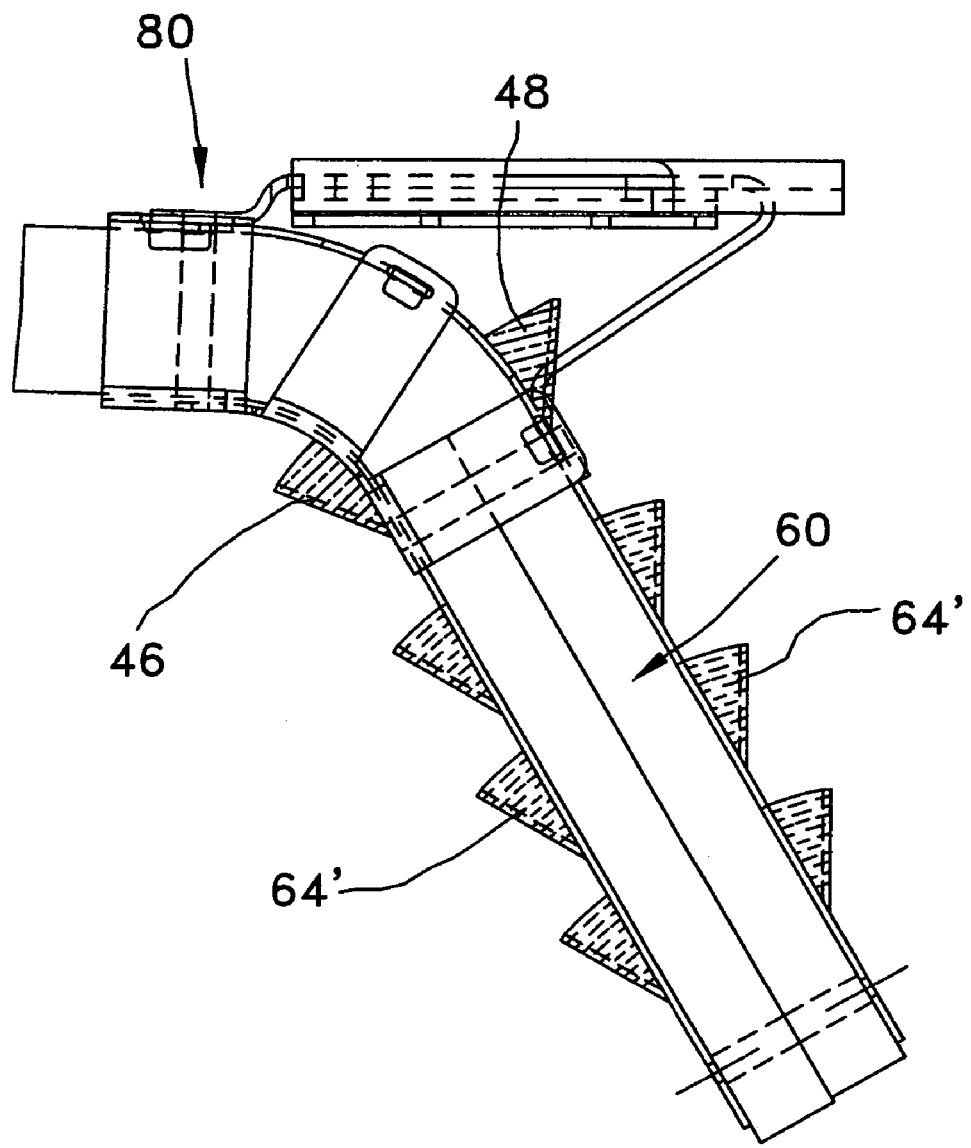

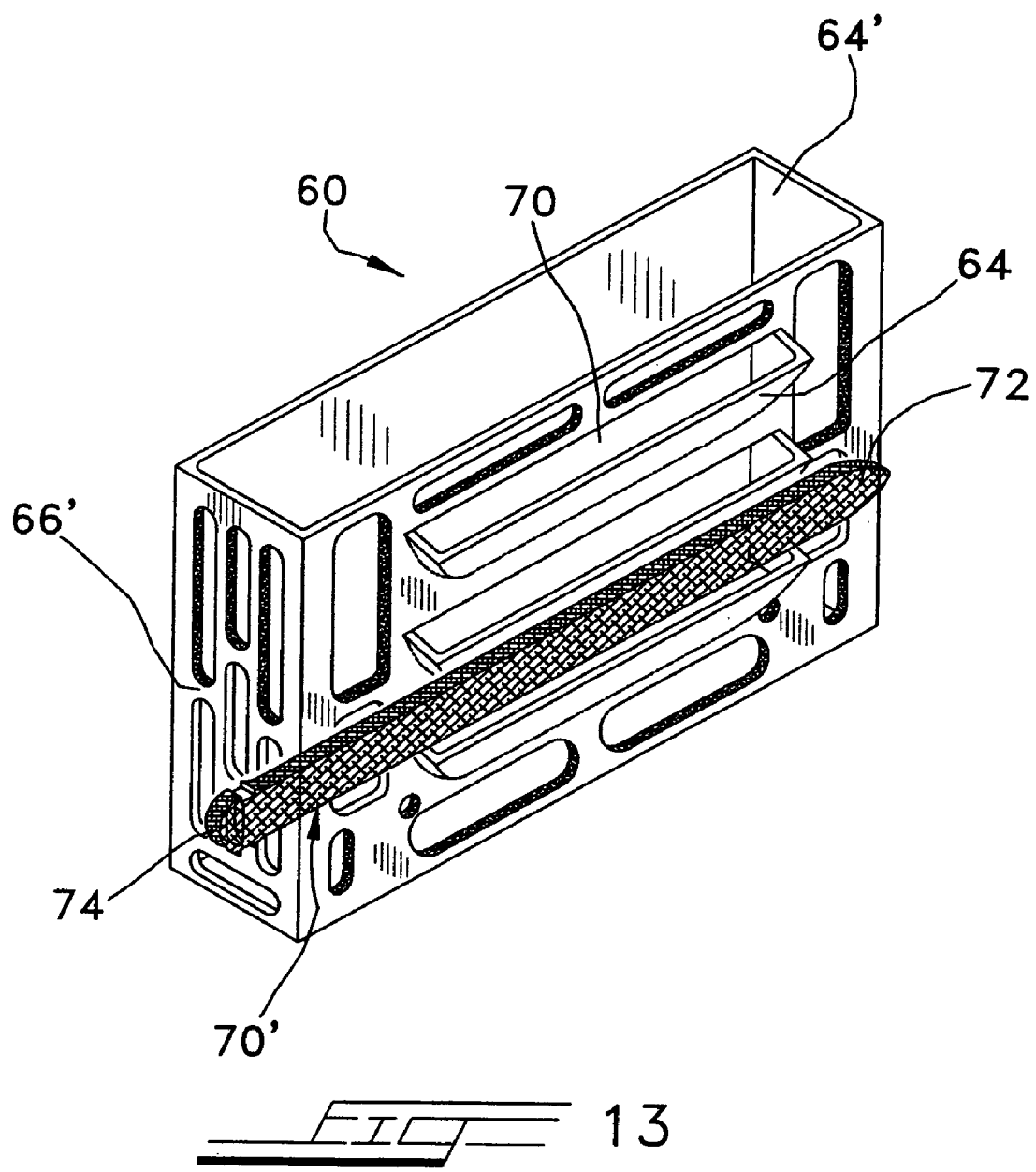

WICK HOLDER FOR A LUBRICATING SYSTEM OF A LOCOMOTIVE TRACTION MOTOR SUPPORT BEARING

BACKGROUND OF THE INVENTION

The present invention is directed to an improved wick holder used in a lubricating system for lubricating the axle-journal surface mounted in a support bearing of a locomotive traction motor. The wick holder supports and mounts a central lubricating wick having a lower end portion or section received in an oil reservoir, which oil, via capillary action, is delivered by the wick to the axle-journal surface by means of a window formed in the shell of the traction motor support bearing. The other, upper wick-face section of the wick is received in the window for contact against the axle-journal surface, to thereby provide the proper lubrication.

Examples of this lubricating system are disclosed in the U.S. Pat. Nos. 2,980,472; 3,827,769; 3,905,659; 4,229,056; and 5,082,089. One such prior-art system is also shown in FIG. 1, and is indicated generally by reference numeral 10, and includes an oil reservoir 12 for storing lubricant, and a carrier assembly 14 connected to the axle cap 16 of a friction support bearing 18 used for mounting a locomotive traction motor to the wheel axle assembly. The carrier assembly 14 has a spring 22, such as a coil or torsion spring, that biases a wick-holder unit 34 toward a window 26 formed in the shell of the friction support bearing 18, through which window oil is delivered to the axle-journal surface 37 mounted in the friction support bearing.

The wick-holder unit consists of a slide bracket element or member 32 which is mounted for sliding movement in the carrier assembly 14, a wick holder member 34 of arcuate shape that is connected to the slide bracket element 32, and a felt wick 36 having an upper section of similar arcuate shape mounted in the wick holder 34.

The above-described wick lubricator assembly of the prior art, however, has serious shortcomings. Specifically, these prior art oil-lubricating delivery systems have decreasing ability to deliver a continuous amount of oil to the axle-journal surface area as the oil level in the journal box is consumed over time, as the oil level in the oil reservoir decreases, even though the wick had initially absorbed oil to saturation.

When a new traction motor/axle wheel set of a locomotive is placed into service, it has approximately twelve pints of journal oil added to the bearing oil reservoir. Capillary-oil lift is typically less than two inches. During normal operation, the oil is consumed and the oil level in the reservoir continues to drop, resulting in reduced oil-saturation of the felt wick. As a result, the oil delivery-rate is reduced in inverse proportion to the increased required oil-wicking height. The result of this reduced oil delivery can be a repetitive cycle of reduction in the load bearing capacity of the journal and an increase in the operating temperature of the bearing each time the locomotive accumulates mileage between normal servicing. As a result of this reduction of lubrication delivered to the journal, the margin of excess bearing capacity can be reduced such that a condition is created that can end in a failure of the bearing and axle.

It would, therefore, be advantageous to provide an improved wick-lubricating delivery system for an axle-journal surface supported by a friction bearing of a locomotive traction motor that diminishes the adverse effect of oil depletion in the journal box and oil reservoir, in order to continue to supply the requisite lubricating oil to the axle-journal, thereby reducing railroad operating expenses by improving reliability and length of service of the existing traction motor/axle-wheel set combination.

SUMMARY OF THE INVENTION

It is, therefore, the primary objective of the present invention to provide an improved wick-holder for a wick lubricating system for the axle-journal surface supported by a friction support bearing of a locomotive traction motor which delivers a greater amount of oil even as oil is depleted from the oil reservoir.

In accordance with the present invention, an improved wick-holder for mounting a felt lubricating wick is provided with a plurality of oil-reservoir pockets or cups molded or pressed into the wick holder which store oil from the time that the oil reservoir was full or near its maximum height. These reservoir pockets also collect oil that has been splashed or sloshed within the oil reservoir during normal locomotive operation, thereby delaying the run off of the oil and to increase the oil saturation of the wick housed within the wick holder. These oil reservoir pockets are located above the minimum serviceable oil level, and are designed to improve and increase oil saturation of the wick. As a result of the increased oil saturation, the wick is, therefore, capable of delivering increased amounts of oil to the axle-journal surface. This increased amount of oil saturation provides better protection against axle-journal bearing failure in the event that a locomotive is operated with insufficient or diminished oil levels. It also provides reduced wicking height. Felt wicks exhibit an ability to be saturated with liquids and lift the liquids above the level of the liquid in a reservoir. This ability is called "wicking height" and is measured in linear graduations after a given period of time while the viscosity of the liquid is maintained at a standard value. The higher the wick is sampled above the reservoir, the smaller the percent of saturation is encountered. In accordance with the improved wick holder of the invention, when lubricant is artificially introduced via the collection reservoir pockets during splashing of oil in the oil reservoir, the percent saturation above these locations will be increased and, in turn, the lubricant available at the delivery wick-face will be increased. The increased oil saturation at an intermediate height of the wick will reduce the required wicking height of the wick, therefore allowing a greater amount of oil lubrication at the axle journal. The increased wick saturation and delivery rate act to reduce wick-face temperatures and extend the life of the wicks. The increased amount of oil saturation and reduced wicking height provide increased protection against traction motor support-bearing failure if a locomotive is used with axle-journal oil levels near the recommended minimum oil levels. In addition, the increased saturation may increase time interval between scheduled wick replacements.

The reservoir pockets are preferably shaped as louvers, whereby during normal locomotive operating service, with the traction motor being subject to significant "g" force acceleration, "oil sloshing" and "oil splash" in the bearing-housing oil reservoir occur, whereby these louver-shaped splash cups or pockets of the wick holder of the present invention capture or collect oil as it sloshes or splashes during locomotive service. The captured oil is immediately absorbed into the wick's felt material and then transferred to the axle-journal surface area by capillary action.

In a second embodiment of the invention, a splash sleeve made of metal or elastomeric material is provided that slides over the tail or lower end section of the existing felt wick lubricator. This splash sleeve is used to encase the lower end portion of the wick below the existing wick support holder. The splash sleeve preserves the maximum possible exposure of the felt wick to lubrication oil, while introducing splash louvers on each side of the lubricator pad. The splash sleeve is preferably held in place by, for example, a retaining pin that passes through the sleeve and between the two felt layers of the felt wick, and rests upon the main bodies of the two rivets which clamp these two felt layers together.

BRIEF DESCRIPTION OF THE DRAWING

Reference is had to the drawings, wherein:

FIG. 2B is a side elevational view of the first embodiment of FIG. 2A showing the wick holder in isolation, incorporating the louver-shaped reservoir pockets of the invention;

FIG. 2C is a partial cross-sectional rear view of the wick holder of FIG. 2B, showing the louver-shaped reservoir pocket of the invention which had been formed by punching out material from the wick holder itself;

FIG. 8A is a side elevational view of the second embodiment of FIG. 3 showing the wick holder incorporating the splash sleeve of the second embodiment;

FIG. 8B is a plan view of a retaining pin for fastening the splash sleeve of the second embodiment to the felt wick;

FIG. 9 is a side elevational view similar to FIGS. 2B and 8A of a third embodiment of the invention which is a combination of the first embodiment of FIG. 2A and the second embodiment of FIG. 4;

FIG. 13 is an isometric view similar to FIG. 4 but showing the retaining pin in place for securing the splash sleeve of FIG. 4 on the lower end of the lubricating wick;

DETAILED DESCRIPTION OF THE INVENTION

Figure 1:
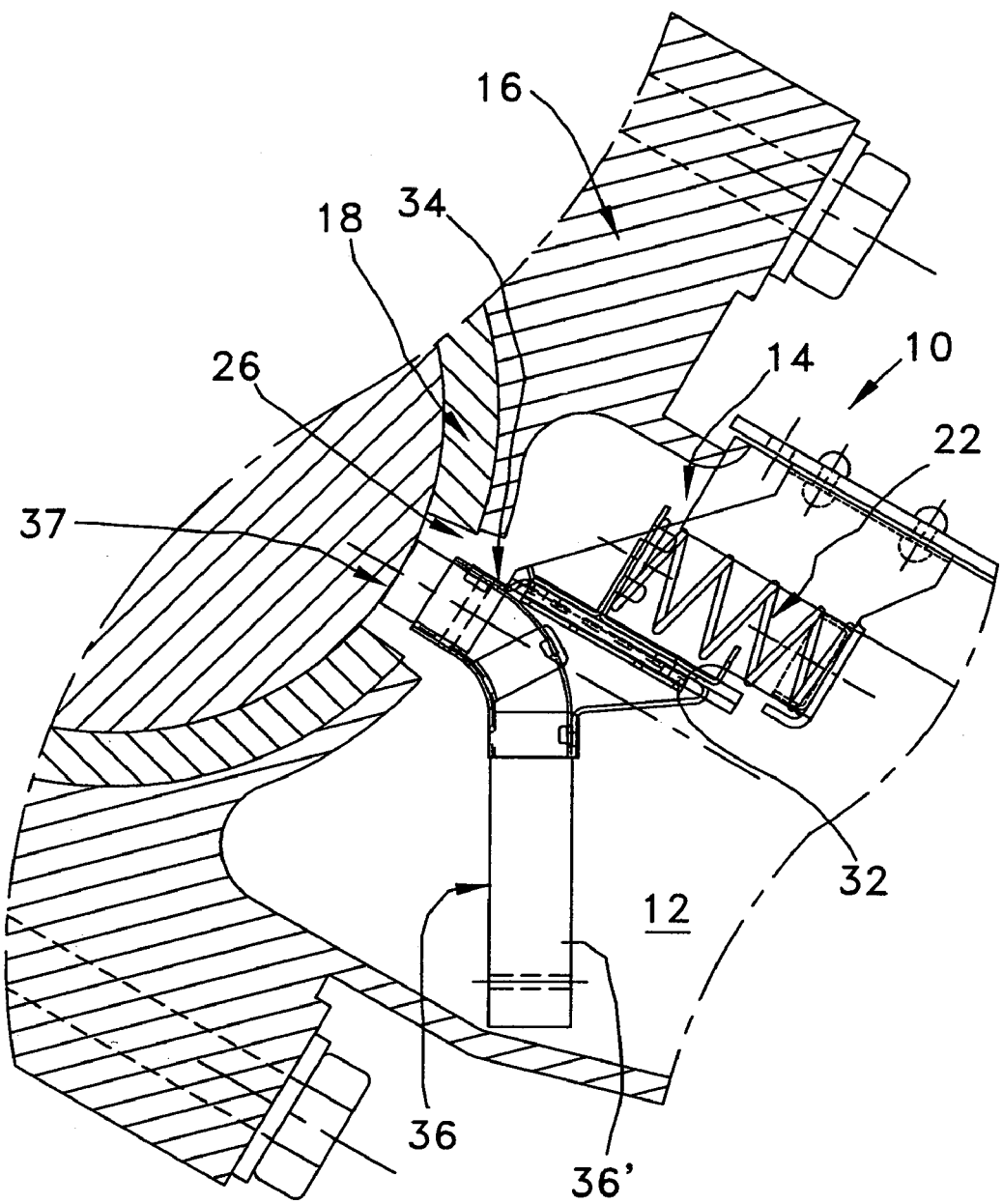
FIG. 1 is a partial vertical cross-sectional view of a prior-art locomotive traction support bearing and axle cap, and showing the prior-art lubricating system.
Figure 2A:
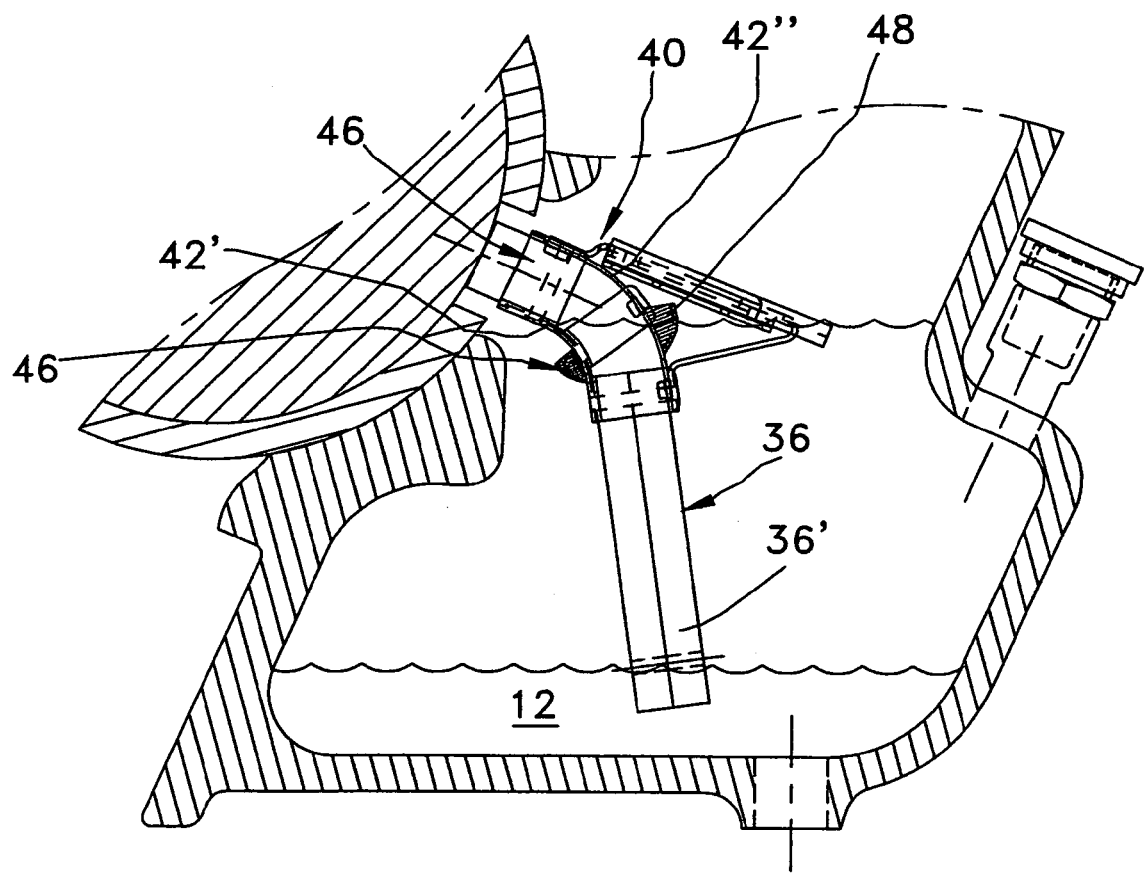
FIG. 2A is a partial vertical cross-sectional view of a locomotive traction support bearing and axle cap, and showing a first embodiment of the improved lubricating system of the invention.
Figure 3:
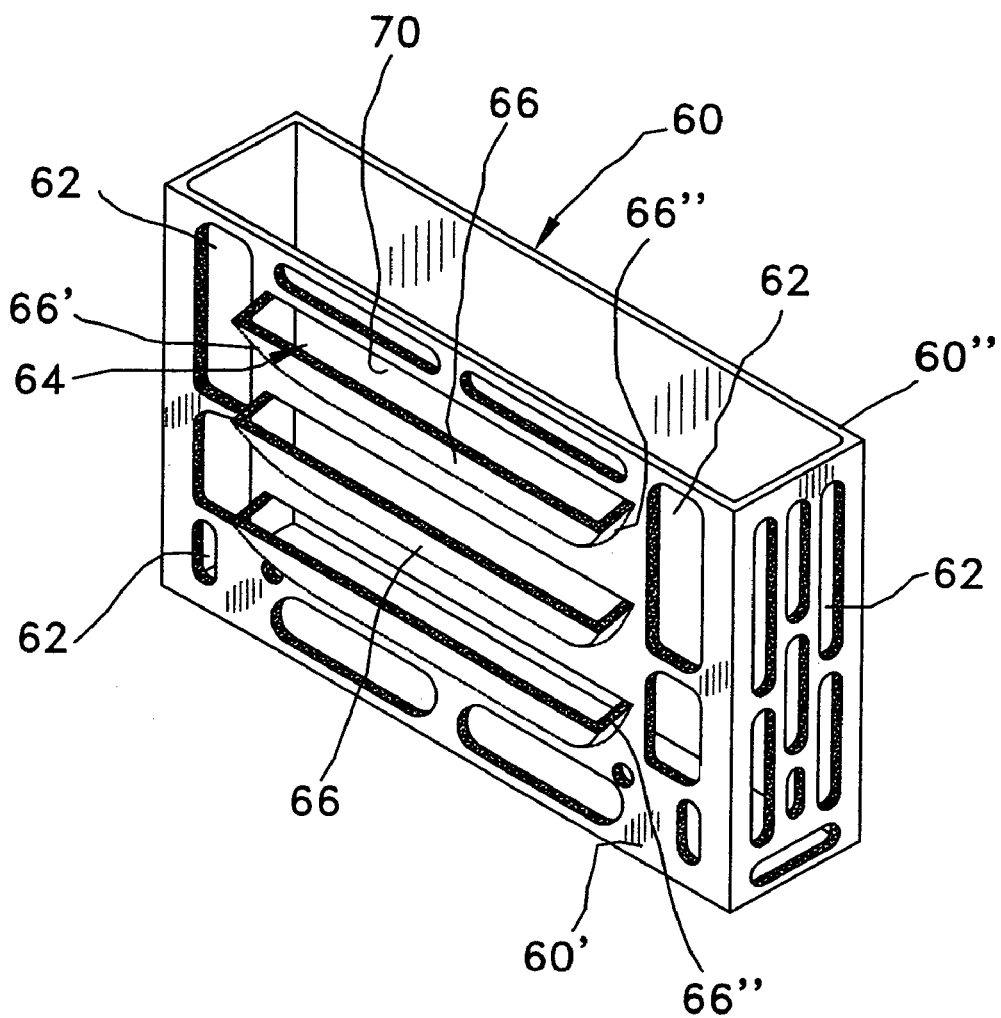
FIG. 3 is a first isometric view of a second embodiment of the invention where a splash sleeve incorporating louvers which in combination with the wick form reservoir pockets is used for attachment over the bottom or lower portions of a wick lubricator.
Figure 4:
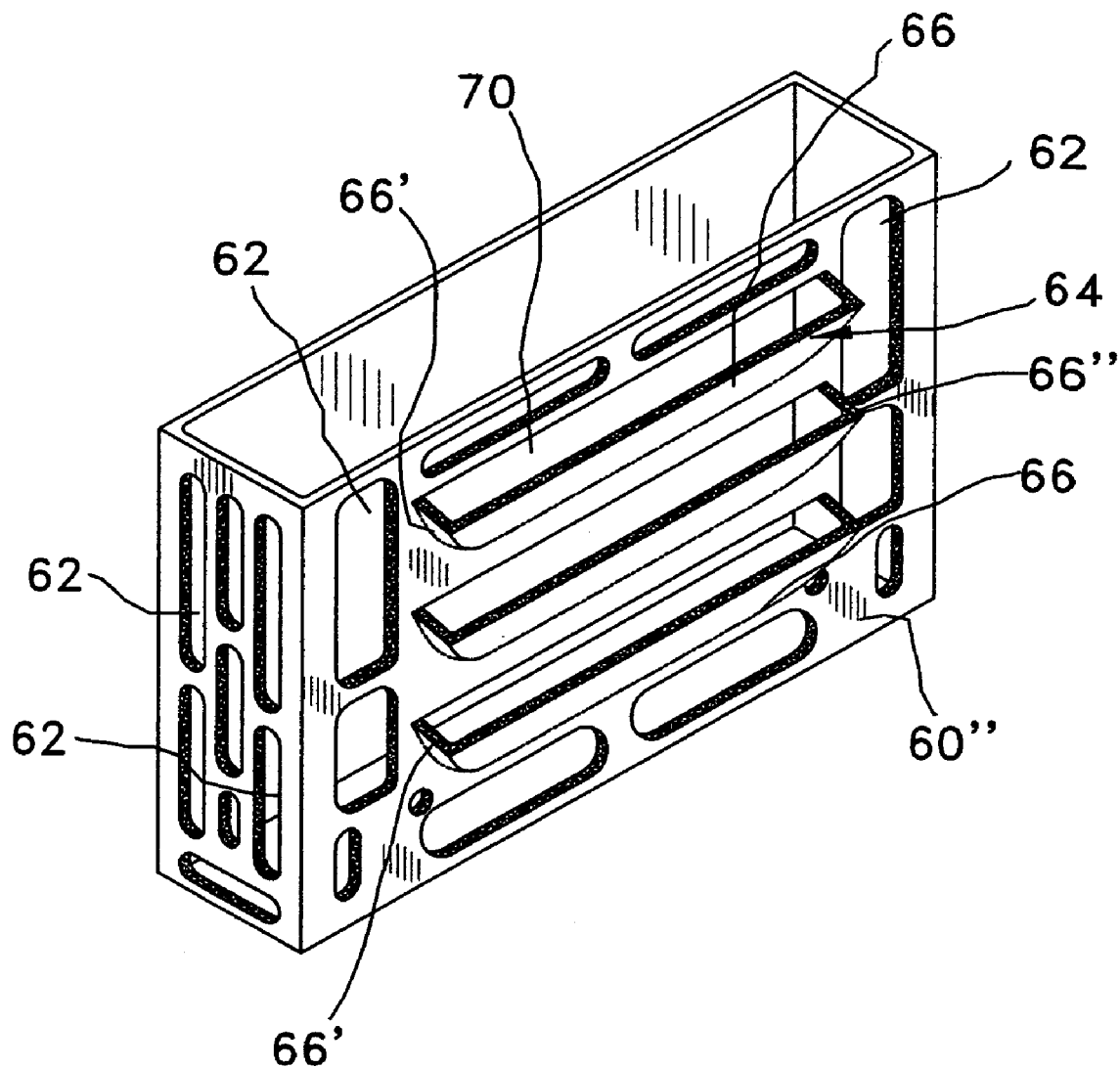
FIG. 4 is a second isometric view of the second embodiment of the invention of FIG. 3.
Figure 5:
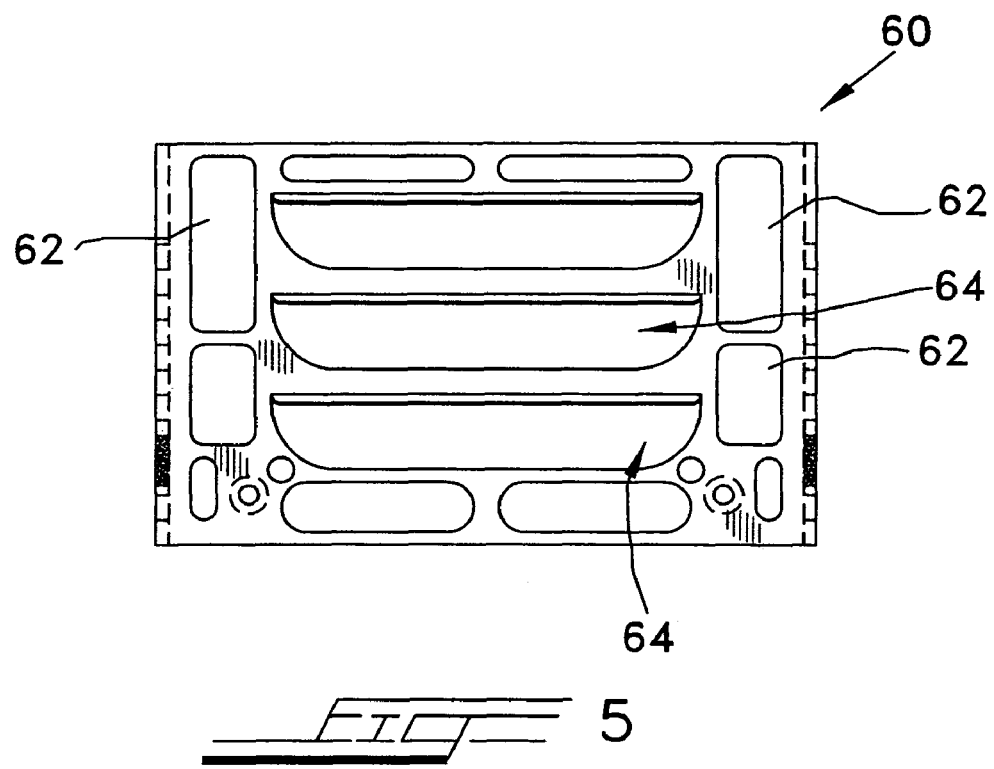
FIG. 5 is a plan development view of a metal forming the splash sleeve of FIG. 3, prior to forming the sides thereof.
Figure 6:
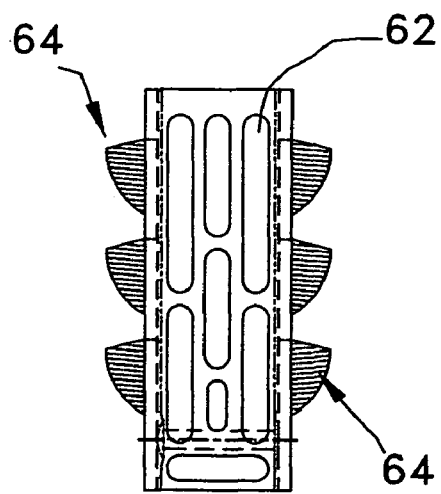
FIG. 6 is an end view thereof.

Referring now to the drawings in greater detail, and to FIGS. 2A-2C, there is shown the first embodiment of the improved wick holder of the invention. The wick holder 40 of the first embodiment of the invention is similar to that utilized in the conventional wick holder assembly 10 of the prior described hereinabove with reference to FIG. 1, with the exception that wick holder member 44, which is similar in arcuate shape as the wick holder member 34 of the prior art, is provided with two reservoir louver pockets or collectors 46, 48, at a location along the height of the wick holder member 44 that is above the minimum serviceable oil level of the oil reservoir 12. The two louver pockets 46, 48 are provided along the main elongated front and rear surfaces of the wick holder element 44, and at an approximate height where the wick holder's curvature is most pronounced, although other heights are also suitable. The first, inwardly-facing reservoir louver pocket 46 is formed on the bottom or rear, interior-facing wall or surface 42' of the wick holder, while the reservoir louver pocket 48 is formed on the upper or front surface or wall 42" facing away from the bearing surface. Owing to the curvature of the wick holder 40, the front reservoir louver 48 is at a higher elevation than that of the lower reservoir louver. The lower reservoir louver 46, being closer to any minimum serviceable oil level on the oil reservoir 12, serves to collect and provide oil to the lubricating wick during such minimum level as compared with the upper reservoir louver.

The location of these reservoir louvers 46, 48 are such that, when the oil level in the oil reservoir tank 12 falls to a level below the cups 46, 48, the reservoir louvers 46, 48, collect oil that has been splashed within the reservoir during normal locomotive operation, and delay the run off of the oil to increase the oil saturation of the wick housed within the wick holder, in order to continue to provide additional wick-lubrication from internal oil-splashing and sloshing, even after the oil level falls to a minimum serviceable level below the height of the reservoir louvers 46, 48 due to the normal splashing and sloshing of the oil in the reservoir 12 during normal operation of the locomotive. The splashed oil is collected in each reservoir louver via each upwardly-facing opening 46', 48', respectively, and delivered to the felt wick lubricator via an opening 46" formed in the wick-holder member in opposite juxtaposition to each louver 46, 48 as seen in FIG. 2C. As may be seen in FIG. 2C, each reservoir louver pocket is formed by punching out a portion of the material of the wick holder, to thus form the upwardly-facing openings or mouths 46', 48', respectively, and to also form the front wall 50 thereof. In the preferred form of the invention, the lower, rear louver is less than two inches away from the wick delivery face of the wick, although this distance may be changed.

The splash reservoir louvers 46, 48 are initially submerged under the oil-line of the oil reservoirs during normal use. As the oil is consumed during normal service-operation of the locomotive, with the concomitant falling of the oil level below the splash reservoir louvers 46, 48, oil saturation of the wick material is restored at the intermediate point of the wick from the oil stored in these splash reservoir louvers and directed toward the wick. While the reservoir louvers 46, 48 are submerged in the oil, they continue to feed the felt and maintain maximum wick oil saturation in parallel with the wick-tail immersion. During locomotive operating service, the journal oil in the bearing housing reservoir is sloshed and splashed within the bearing housing reservoir, and continuously refills the splash louvers to maintain maximum oil saturation of the wick material, even after the oil level in oil-reservoir 12 has fallen below the entrance mouths 46', 48'.

Referring now to FIGS. 3-8, there is shown a second embodiment of the invention. In this embodiment, a separate, independent splash sleeve 60 is used that slides over, or is telescopingly received about, the free end-portion 36' (FIG. 1) of the felt wick lubricator stationed in the oil reservoir. This free end-portion of the wick lubricator 36 is that which projects downwardly from the wick holder, such as wick holder 34 of FIG. 1.

The hollow splash sleeve 60 is made of metal, plastic, or other suitable material, and is preferably rectilinear in cross section to match the shape of the felt wick lubricator 36 over which it is received. The splash sleeve 60 is provided with a series or plurality of elongated openings 62 on all four surface walls in order to allow the oil stored in the oil reservoir 12 to pass therethrough and lubricate the felt wick lubricator. These openings 62 are necessary since the slash sleeve covers the portion of the felt lubricator that is usually positioned within or inside the oil of the oil reservoir during at least the higher oil levels of the reservoir.

The splash sleeve 60 is also provided with a series or plurality of oil-collecting reservoir pockets or cups 64 on each of the longer rear and front walls 60', 60" of the splash sleeve. Each pocket or cup 64 may be a louver similar to those described hereinabove with respect to the first embodiment, but in the preferred embodiment are pockets or cups, that are arranged in a vertical array where each is parallel to another, although different formations may be utilized, as well as more or less than the three cups 64 shown in the drawing for each of the front wall surface 60' and rear wall surface 60".

Figure 7:
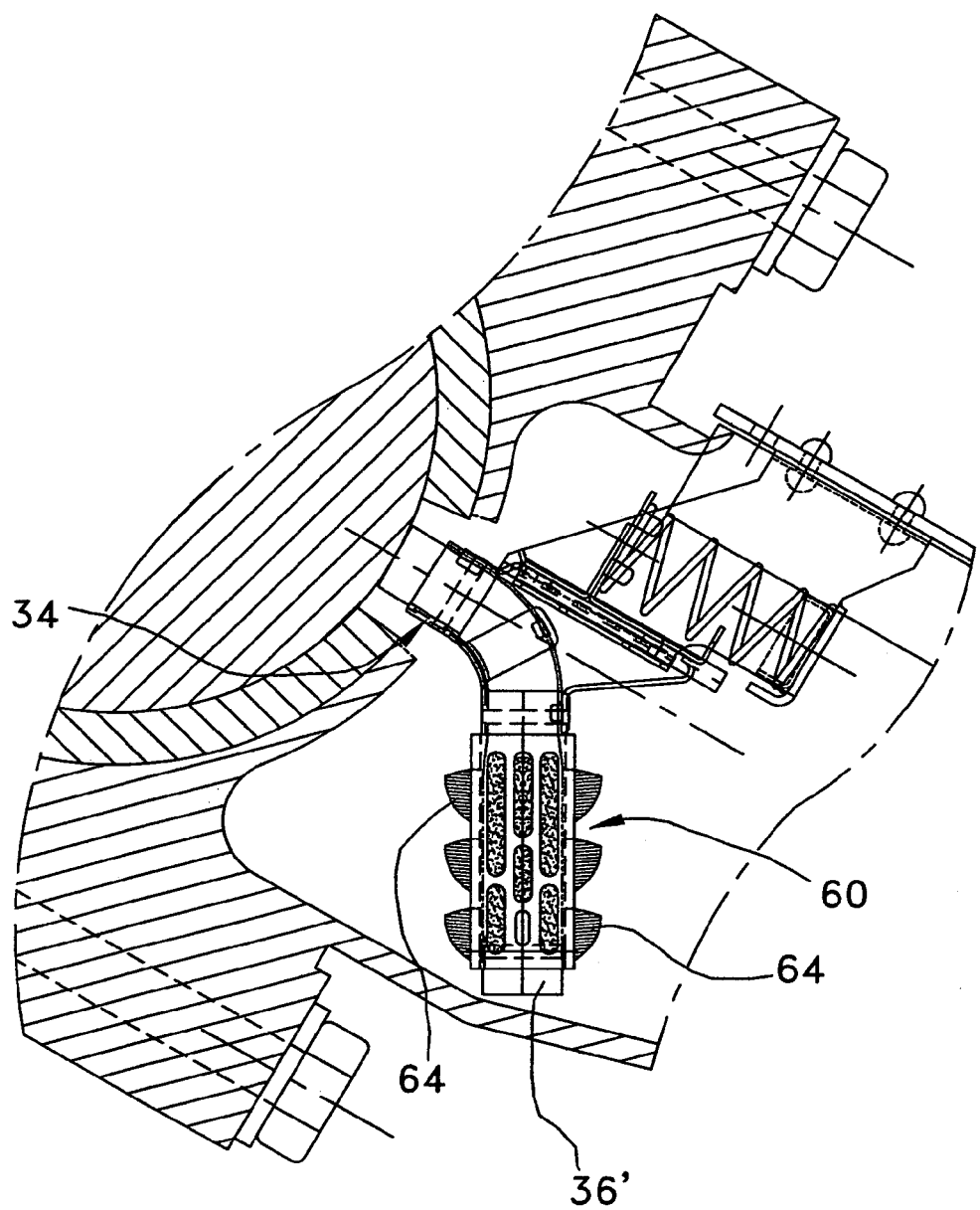
FIG. 7 is a partial vertical cross-sectional view of a locomotive traction support bearing and axle cap, and showing the splash sleeve of the second embodiment of the invention mounted in place over a lubricating wick.

Each cup 64 has an upper opening or mouth formed to form a front wall 66 and side walls 66', 66", which form a temporary reservoir for delivering the oil splashed therein during normal operation of the locomotive, for subsequent delivery to the felt wick located within the splash sleeve, via openings 70 cut out of the splash sleeve during formation of each cup 64, similar to the opening 46' of FIG. 2C. As can be seen in FIGS. 7 and 8A, the splash sleeve 60 covers the lower exposed portion 36' of the wick lubricator extending or protruding from the bottom of the wick holder 34.

Figure 15:
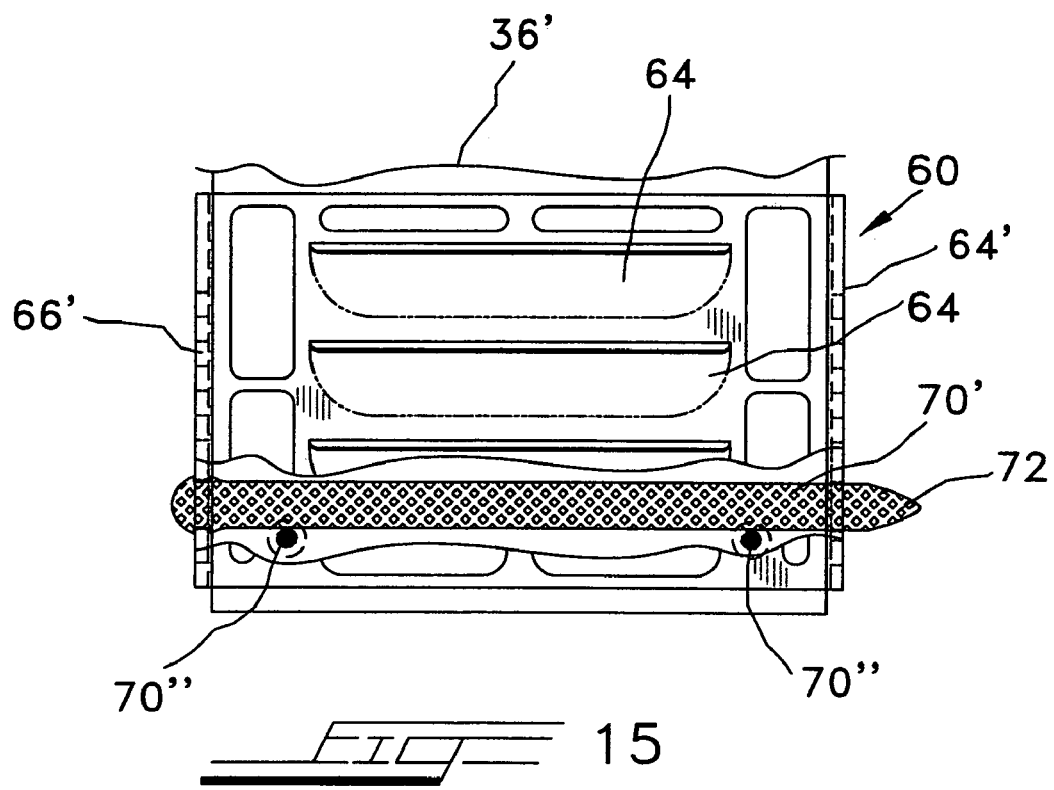
FIG. 15 is a side view thereof.
Figure 14:
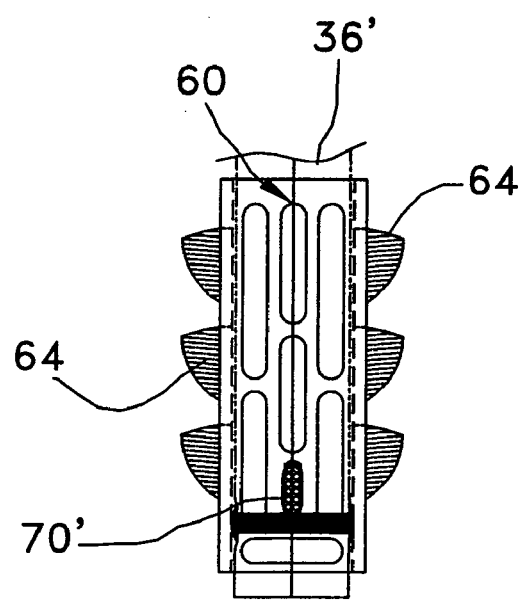
FIG. 14 is an end view thereof.

Referring to FIGS. 8B and 13-15, there is shown the manner by which the splash sleeve 60 is secured or mounted about the wick lubricator by means of, for example, a retaining pin 70' that passes through oppositely-aligned openings 62' of the side walls 64', 66' of the sleeve 60 and through the interface of the felt layers of the felt wick lubricator. The retaining pin 70' has a first tapered end 72 to aid in the insertion of the pin through and between the felt layers of the wick lubricator, and a second enlarged end 74 defining an annular retaining groove 76 for receiving therein portions of the circumferential rim in an opening 62' in one of the side walls 64', 66' through which the pin has been passed, to retain the pin in place. The portion of the pin 70' directly adjacent to, and inwardly of, in a direction taken from the enlarged end 74 toward the tapered end 72, is canted or sloped in order to provide a snap-fit type of connection. The pin 70' is preferably oval in cross section as the shape of the openings 62' of the side walls 64', 66'. However, other cross-sectional shaped may be employed, with the openings in the side walls through which is passes being of similar cross section and matching dimensions. As may be seen in FIGS. 13-15, the retaining pin 70' rests upon the conventional two rivets 70" that hold two felt layers of the conventional wick together at the bottom or wick tail-end of the lower exposed portion 36' of the wick, thereby supporting and retaining the splash sleeve on the wick tail-end of lower exposed portion 36'. As seen in FIGS. 13-15, when mounting the splash sleeve to the lower, or tail-end, of the lubricating wick, the retaining pin is inserted at the interface between the two felt-layers of the wick and rests upon the two spaced-apart rivets, which extend perpendicularly to the length of the retaining pin 70', which rivets, in the conventional manner, secure the two felt-layers of the wick together. It is, of course, possible to secure or mount the splash sleeve to the wick in other ways or manners.

Referring to FIG. 9, there is shown yet another embodiment of the invention which is a combination of the first two embodiments. In this embodiment, the wick holder 80 is the same as the wick holder 40 of FIG. 2A-2C, with the two reservoir louvers 46, 48. In order to enhance even more the lubrication of the wick, the splash sleeve 60 of the second embodiment of FIGS. 3-8 is also simultaneously employed over the cantilevered end of the felt lubricating wick, as described hereinabove with reference to FIGS. 3-8. In this embodiment, as shown, the reservoir collectors 64' are shaped as louvers, as in the reservoir louvers 46, 48 of the wick holder.

Figure 10A:
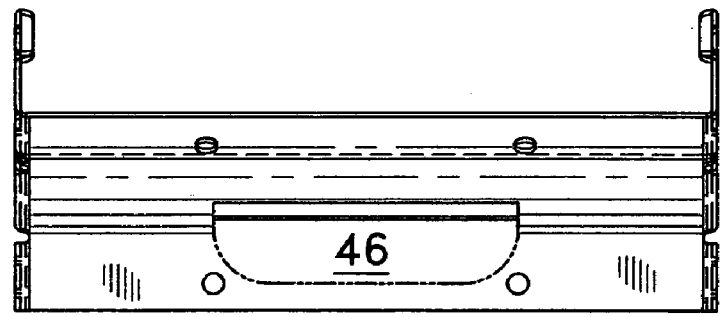
FIG. 10A is a rear, plan view of a fourth embodiment of the invention similar to the first embodiment of FIG. 2A but incorporating only one reservoir pocket of the invention, on the interior, or bearing-facing, surface of the wick-holder.
Figure 10B:
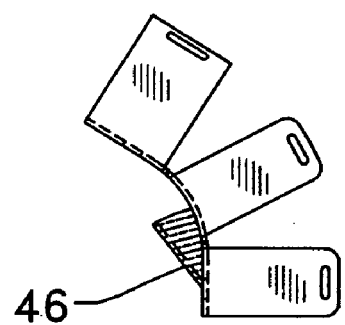
FIG. 10B is a partial side elevational of the fourth embodiment of FIG. 10A.

FIGS. 10A and 10B show a modification of the first embodiment of FIGS. 2A-2C, where instead of utilizing two louver-shaped reservoir pockets or cups 46, 48, only the inner, or bearing-support facing, reservoir pocket 46 formed in the rear wall of the wick holder is used.

Figure 11A:
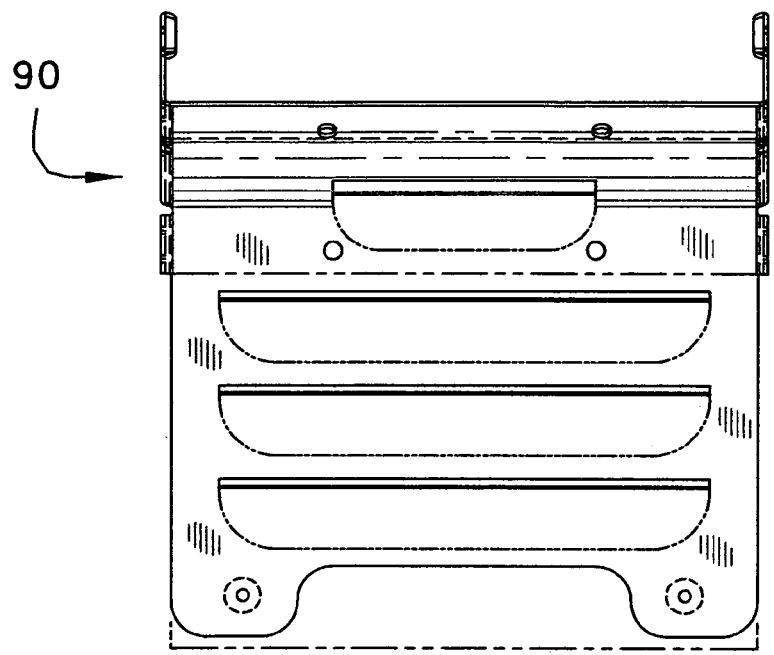
FIG. 11A is a rear, plan view of a fifth embodiment of the invention similar to the first embodiment of FIG. 2A where the wick holder is extended downwardly in the interior, or bearing-facing, surface for providing additional reservoir pockets or compartments facing interiorly toward the bearing surface.
Figure 11B:
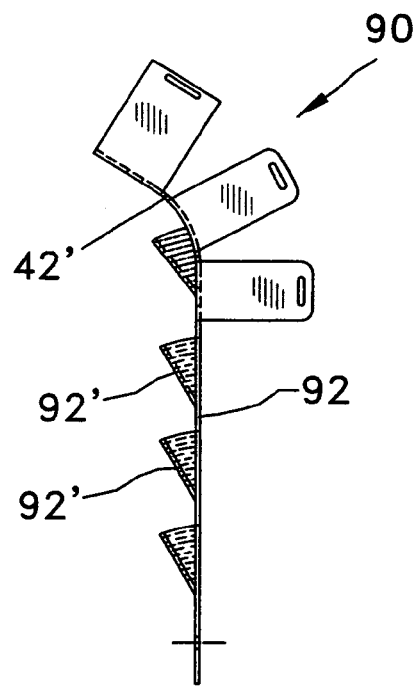
FIG. 11B is a partial side elevational of the fifth embodiment of FIG. 11A.

FIGS. 11A and 11B show a modification of the embodiment of FIGS. 9A-9B, where the wick holder 90 is similar to wick holder 40 of FIG. 2A-2C, but with an interior and downwardly-projecting extension 92 extending integrally from, and serving as an extension of, the rear wall or surface 42'. Punched out of this rear-wall extension 92 are a plurality of the reservoir louvers 92'. The length of the extension 92 may vary depending upon lubricating requirements. The extension 92 preferably extends about one inch from the main wick frame, although this length may be different.

Figure 12A:
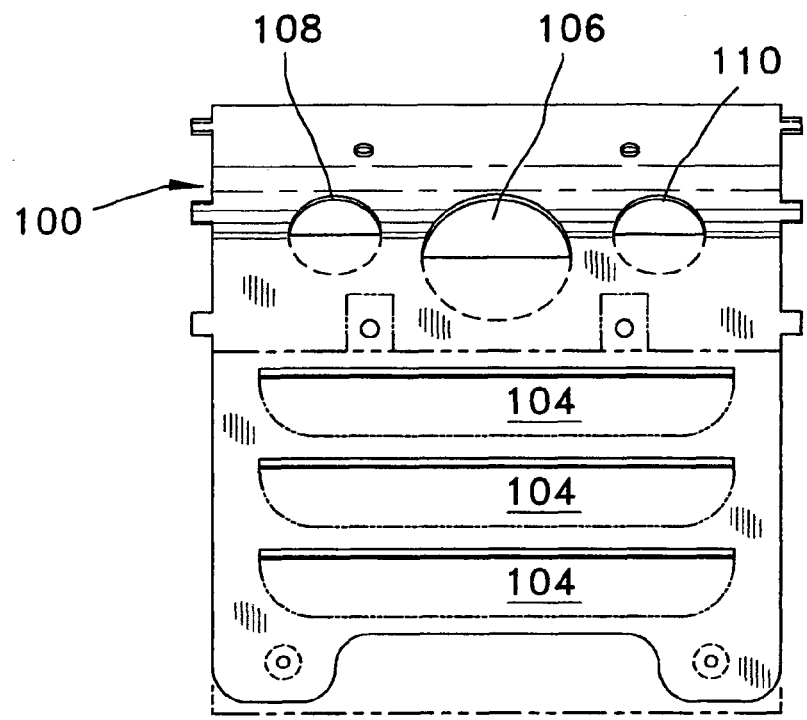
FIG. 12A is a front, plan view of a sixth embodiment of the invention similar to the fifth embodiment of FIG. 11A but where the wick holder is extended downwardly in the exterior, or outwardly-facing, surface thereof for providing additional reservoir pockets or compartments facing the exteriorly away from the bearing surface.
Figure 12B:
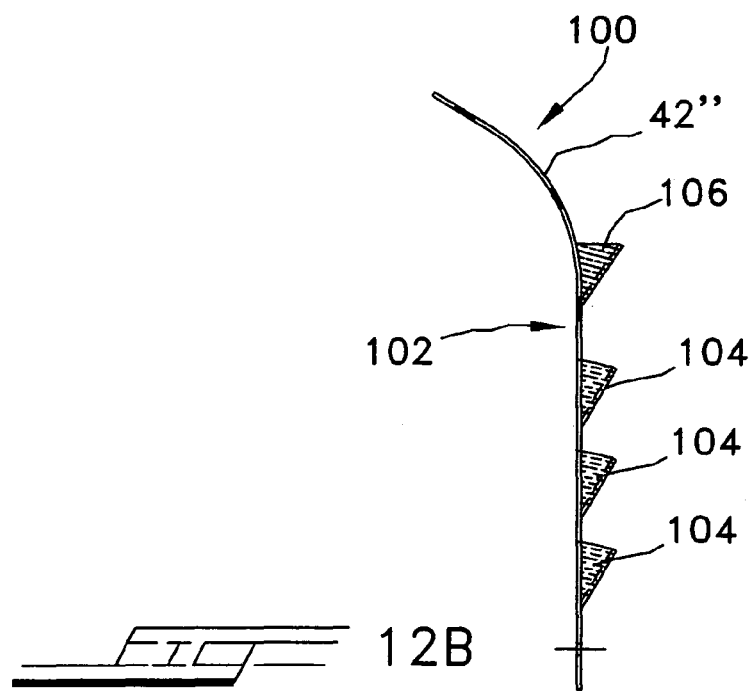
FIG. 12B is a partial side elevational of the sixth fifth embodiment of FIG. 12A.

FIGS. 12A-12B show yet another modification similar to the modification of FIGS. 11A and 11B, but instead of a rear-wall extension having louver-shaped reservoir cups formed therein, the wick holder 100 of this modification has an exterior and downwardly-projecting extension 102 extending integrally from, and serving as an extension of, the front wall or surface 42" of the wick holder 40 of the first embodiment of FIGS. 2A-2. Punched out of this rear-wall extension 102 are a plurality of the louver-shaped reservoirs 104. The length of the extension 102 may vary depending upon lubricating requirements. It is also noted, that in this modification, the front or upper surface 42" of the wick holder is provided with three separate louver reservoir pockets: A central one 106, and two end ones 108, 110, instead of the one louver-shaped reservoir 48 of FIG. 2A-2C. The extension 102 preferably extends about one inch from the main wick frame, although this length may be different.

Figure 16:
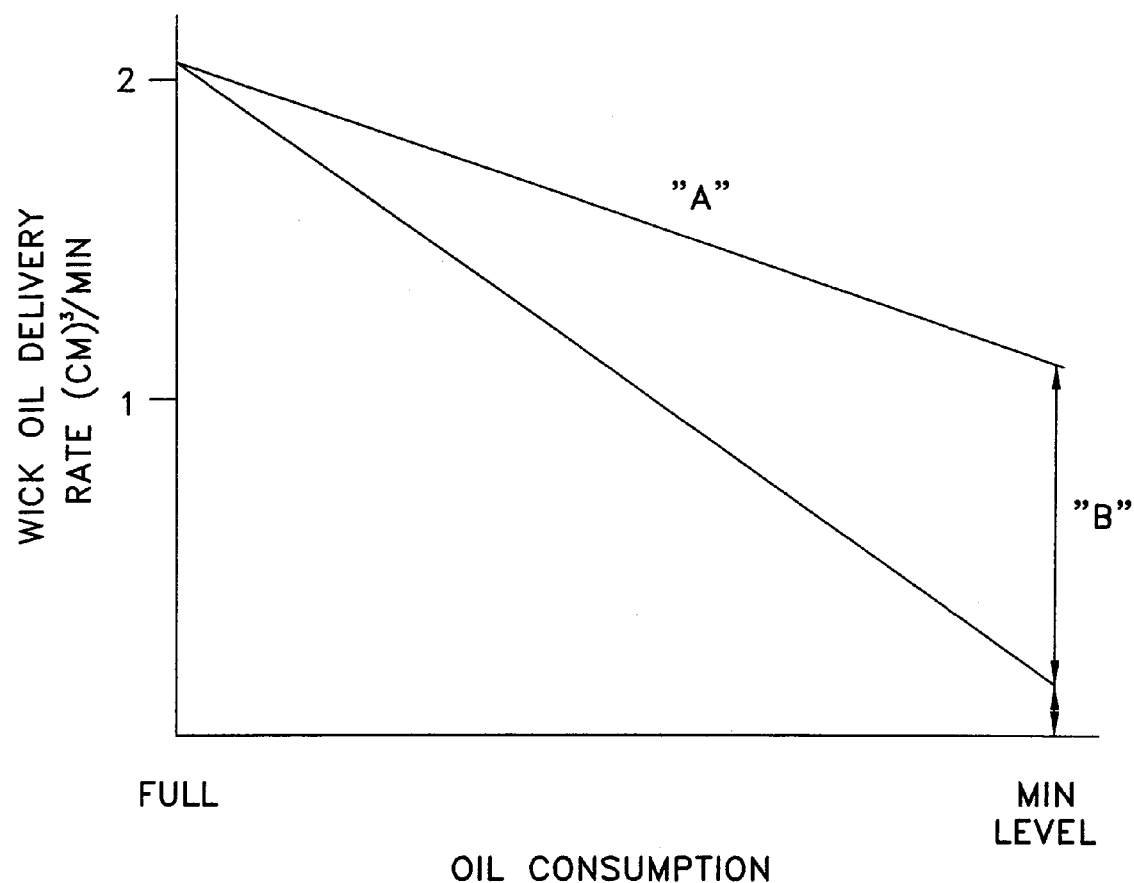
FIG. 16 is a graph showing the improved oil delivery rate of the wick lubricator according to the invention versus the prior art.

Referring now to FIG. 16, there is shown a graph depicting the enhanced lubrication of the friction support bearing utilizing the invention in contradistinction to the lubrication of achieved in a conventional unit, and shows wick-oil delivery rate vs. oil consumption, that is, the oil level of the reservoir 12. The upper line "A" represents the maximum improvement of oil delivery rates according to the present invention, while the lower line that of the prior-art system. As can be seen, while at the beginning, immediately after servicing, the rates for both are the same (y-axis intercept), where the oil in the reservoir 12 is at its maximum. Over time, however, as oil is consumed during normal usage, the oil delivery rate provided by that of the present invention is consistently greater, with the difference in the delivery rate between that of the present invention and that of the prior art system, increasing the greater the drop in the level of the oil in the reservoir 12. The line "B" represents this range of possible improvement in the oil delivery rate between the system of the present invention and that of the prior art.

The length of the reservoir pocket of the invention is preferably approximately three inches in length, although each may be made shorter or longer.

In order to explain the enhanced lubrication provided by the louver-shaped reservoir pockets of the invention, the oil delivery rate is defined by the following equation:

$$\text{Oil Delivery}=Q=[K_u A F_o(h_u-h)]/\mu L=5 \text{ max. cm}^3/\text{min}$$

where, $K_u$=approximately 4.6 for mineral oil and SAE grade F-1 felt,

A=cross-sectional area of the wick (cm$^2$), $F_o$=volume fraction of oil in saturated wick (approximately 0.75), $(h_u-h)$=vertical lift [ultimate lift ability of SAE grade F-1 felt (about 18 cm] minus the elevation of the wick face above the oil supply], $\mu$=approximately 58 centipoise viscosity at 40 degrees C. oil temperature;

L=distance from the wick delivery face to the point of absorption (cm).

The two terms $(h_u-h)$ and L are the ones that are favorably effected by the addition of the oil reservoir pockets of the invention. The term $(h_u-h)$ is increased in magnitude as the required lift is decreased by introduction oil above the reservoir surface. At the same time, the term L is decreased as the oil travels as shorter distance from the point of absorption to the point of delivery.

While the reservoir louver pockets of the invention have been described as being louver-shaped, it is understood that such is not meant to be limiting, and that it is also within the scope and purview of the invention to use reservoir pockets that are of different shape and configuration, as long as the oil being splashed during operation is trapped therein and then delivered to the lubricating felt wick, especially during oil levels in the oil reservoir approaching the minimum serviceable operational level. Moreover, while it has been stated that these reservoir cups or pockets are punched out of the wick holder itself, or punched out of the splash sleeve or wall-extensions of the wick holder, other methods may be employed.

It is also to be understood that while the oil-reservoir pockets of the invention have been shown to be part of a specific type of wick holder, such as that shown in U.S. Pat. Nos. 3,827,769 and 5,082,089, they may easily and readily be employed in other and all types of wick holders, such as those disclosed in U.S. Pat. Nos. 2,980,472 and 3,905,659, as well as others, and no limitation has been meant with disclosure of the reservoir pockets of the invention provided in one kind of wick holder.

With regard to the splash sleeve of the second embodiment of FIGS. 3-8, it is also possible to eliminate most of the side walls of the splash sleeve 60 that connect the rear and front walls 60', 60", and use the simple louvers of the first embodiment.

In all of the above versions of the invention, when used for a lubricating wick intended for GE locomotive traction motors, the louver-shaped lubricant-reservoir pockets or splash cups may be, for example, approximately three inches in length. For an EMD locomotive traction motor, the width would be increased to match the increased width of the EMD wick. The length of the splash sleeve may be approximately 3.6 inches, while the material may be metallic or an elastomeric. Of course, the above-mentioned dimensions and material, as well as how the louver-shaped lubricant-reservoir pockets or splash cups are formed, have been only by way of example, and are not meant to be limiting.

While specific embodiments of the invention have been shown and described, it is to be understood that numerous changes and modifications may be made therein without departing from the scope and spirit of the invention

What is claimed is:

1. In an arcuate-shaped wick holder for mounting a central lubricating wick so that a lower portion of the lubricating wick is immersed in an lubricant reservoir and an upper portion of the lubricating wick is received in a central wick window for lubricating a journal surface mounted by a support bearing of a railway locomotive traction motor, said wick holder comprising an upper surface and a lower surface, the improvement comprising:

at least one lubricant-reservoir collection element in at least one of said upper surface and said lower surface of said wick holder for temporarily storing lubricant therein and for delivering the lubricant to a lubricating wick;

said at least one lubricant-reservoir collection element projecting away from said at least one of said upper surface and said lower surface of said wick holder and comprising an entrance opening for receiving lubricant therein;

said at least one of said upper surface and said lower surface of said wick holder having at least one opening in fluid communication with said at least one lubricant-reservoir collection element for delivering the lubricant from said at least one lubricant-reservoir collection element to the central lubricating wick, whereby additional lubrication of a central lubricating wick is achieved;

said at least one lubricant-reservoir collection element being louver-shaped and comprising a main wall section projecting outwardly at an acute angle from said at least one of said upper surface and said lower surface of said wick holder; said entrance opening facing upwardly.

2. The wick holder according to claim 1, comprising at least two lubricant-reservoir collection elements, at least one formed in said upper surface and at least one formed in said lower surface of said wick holder.

3. The wick holder according to claim 1, wherein said entrance opening of said at least one lubricant-reservoir collection element faces upwardly so that lubricant splashed during normal operational use may enter therein.

4. A splash sleeve for use with an arcuate-shaped wick holder that mounts a central lubricating wick for lubricating a journal surface mounted by a support bearing of a railway locomotive traction motor, which wick holder mounts the central lubricating wick such that an exposed lower portion of the central lubricating wick extends downwardly from the wick holder for immersion in a lubricant reservoir and such that an upper portion of the central lubricating wick is received in a central wick window, comprising:

a main hollow sleeve for at least partial telescoping mounting over the exposed lower portion of the central lubricating wick said main sleeve having a plurality of surface-walls;

at least one opening formed in at least one of said surface walls for allowing lubricant contained in a lubricating-wick lubricant reservoir to pass therethrough in order to lubricate the lubricating wick positioned therein;

at least one lubricant-reservoir collector in at least one of said surface-walls for temporarily storing lubricant therein and for delivering the lubricant to a lubricating wick;

said at least one lubricant-reservoir collector projecting away from said at least one of said surface-walls and comprising an entrance opening for receiving lubricant therein;

said at least one of said surface-walls having at least one opening in fluid communication with said at least one lubricant-reservoir collector for delivering the lubricant from said at least one lubricant-reservoir collector to the central lubricating wick, whereby additional lubrication of a central lubricating wick is achieved;

said at least one lubricant-reservoir collector being louver-shaped and comprising a main wall section projecting outwardly at an acute angle from said at least one of said surface-walls, said entrance opening facing upwardly.

5. In an arcuate-shaped wick holder for mounting a central lubricating wick so that a lower portion of the lubricating wick is immersed in an lubricant reservoir and an upper portion of the lubricating wick is received in a central wick window for lubricating a journal surface mounted by a support bearing of a railway locomotive traction motor, said wick holder comprising an upper surface and a lower surface, the improvement comprising:

at least one lubricant-reservoir collection element in at least one of said upper surface and said lower surface of said wick holder for temporarily storing lubricant therein and for delivering the lubricant to a lubricating wick;

said at least one lubricant-reservoir collection element projecting away from said at least one of said upper surface and said lower surface of said wick holder and comprising an entrance opening for receiving lubricant therein;

said at least one of said upper surface and said lower surface of said wick holder having at least one opening in fluid communication with said at least one lubricant-reservoir collection element for delivering the lubricant from said at least one lubricant-reservoir collection element to the central lubricating wick, whereby additional lubrication of a central lubricating wick is achieved;

said at least one lubricant-reservoir collection element being cup-shaped and comprises a main section projecting from said main housing, and pair of side wall sections connecting said main section to said main housing; said entrance opening facing upwardly.

6. In an arcuate-shaped wick holder for mounting a central lubricating wick so that a lower portion of the lubricating wick is immersed in an lubricant reservoir and an upper portion of the lubricating wick is received in a central wick window for lubricating a journal surface mounted by a support bearing of a railway locomotive traction motor, said wick holder comprising an upper surface and a lower surface, the improvement comprising:

at least one lubricant-reservoir collection element in at least one of said upper surface and said lower surface of said wick holder for temporarily storing lubricant therein and for delivering the lubricant to a lubricating wick;

said at least one lubricant-reservoir collection element projecting away from said at least one of said upper surface and said lower surface of said wick holder and comprising an entrance opening for receiving lubricant therein;

said at least one of said upper surface and said lower surface of said wick holder having at least one opening in fluid communication with said at least one lubricant-reservoir collection element for delivering the lubricant from said at least one lubricant-reservoir collection element to the central lubricating wick, whereby additional lubrication of a central lubricating wick is achieved;

said at least one lubricant-reservoir collection element being a punched-out section of said at least one of said upper surface and said lower surface of said wick holder.

7. A splash sleeve for use with an arcuate-shaped wick holder that mounts a central lubricating wick for lubricating a journal surface mounted by a support bearing of a railway locomotive traction motor, which wick holder mounts the central lubricating wick such that an exposed lower portion of the central lubricating wick extends downwardly from the wick holder for immersion in a lubricant reservoir and such that an upper portion of the central lubricating wick is received in a central wick window, comprising:

a main hollow sleeve for at least partial telescoping mounting over the exposed lower portion of the central lubricating wick said main sleeve having a plurality of surface-walls;

at least one opening formed in at least one of said surface walls for allowing lubricant contained in a lubricating-wick lubricant reservoir to pass therethrough in order to lubricate the lubricating wick positioned therein;

at least one lubricant-reservoir collector in at least one of said surface-walls for temporarily storing lubricant therein and for delivering the lubricant to a lubricating wick;

said at least one lubricant-reservoir collector projecting away from said at least one of said surface-walls and comprising an entrance opening for receiving lubricant therein;

said at least one of said surface-walls having at least one opening in fluid communication with said at least one lubricant-reservoir collector for delivering the lubricant from said at least one lubricant-reservoir collector to the central lubricating wick, whereby additional lubrication of a central lubricating wick is achieved;

in combination with a central lubricating wick mounted by a wick holder, and a retaining device for mounting said splash sleeve to said central lubricating wick; said splash sleeve being telescopingly mounted over at least a section of said exposed lower portion of the central lubricating wick.

8. The wick holder according to claim 7, wherein said retaining device is a retaining pin for mounting said splash sleeve to a central lubricating wick.

9. The wick holder according to claim 8, wherein said splash sleeve comprises two elongated parallel surface-walls, said two elongated parallel surface-walls having aligned openings for passing therethrough said retaining pin; said retaining pin passing through the central lubricating wick at the interface of the felt layers of the lubricating wick; said retaining pin having a first tapered end to aid in the insertion of the pin through and between the felt layers of the lubricating wick, and means for holding said retaining pin in place.

* * * * *